United States Patent [19]
Abe

[11] Patent Number: 5,893,653
[45] Date of Patent: Apr. 13, 1999

[54] OPTICAL SYSTEM FOR PHOTOGRAPHING DEVICE

[75] Inventor: Tetsuya Abe, Hokkaido, Japan

[73] Assignee: Asahi Kogaku Kogyo Kabushiki Kaisha, Tokyo, Japan

[21] Appl. No.: 09/009,260

[22] Filed: Jan. 20, 1998

[30]  Foreign Application Priority Data

Jan. 18, 1997  [JP]  Japan .................................. 9-019887

[51] Int. Cl.⁶ .................................................. G03B 13/02
[52] U.S. Cl. ........................................ 396/384; 396/386
[58] Field of Search ................................. 396/373, 384, 396/385, 386; 348/340, 341

[56]  References Cited

U.S. PATENT DOCUMENTS

| | | | |
|---|---|---|---|
| 4,386,835 | 6/1983 | Inoue | 396/386 |
| 4,531,054 | 7/1985 | Suzuki | 250/216 |
| 4,626,918 | 12/1986 | Morisawa | 348/341 |
| 4,947,198 | 8/1990 | Inanobe et al. | 396/386 |
| 5,604,638 | 2/1997 | Nomura | 359/704 |
| 5,668,674 | 9/1997 | Kanai et al. | 396/385 X |
| 5,706,051 | 1/1998 | Mogamiya | 348/337 |

*Primary Examiner*—W. B. Perkey
*Attorney, Agent, or Firm*—Greenblum & Bernstein P.L.C.

[57]  ABSTRACT

An optical system comprising a photographing optical system, a light splitting element to split a light incident from an object, and a finder optical system to which the light split by the light splitting element is directed. A surface of the light splitting element is constituted as a ghost prevention surface that prevents light incident on the finder optical system from the eye side from being reflected, thereby preventing the ghost light (i.e., the light which affects the object image) from being incident on an image pickup surface. Alternatively, a wall surface of a casing of the optical system is employed as a ghost prevention surface.

15 Claims, 4 Drawing Sheets

5,893,653

1

OPTICAL SYSTEM FOR PHOTOGRAPHING DEVICE

BACKGROUND OF THE INVENTION

The present invention relates to an optical system employed in a photographing device having a beam splitting element for splitting light incident thereon, and in particular, to an optical system employed in a photographing device such as a single-lens reflex camera and/or an electronic still camera, in which light from an object is entered through a photographing lens, and then is split by the beam splitting element and directed towards a finder optical system and to a film plane of a image receiving surface.

Such optical systems used in, for example, in electronic still cameras are generally constituted such that a beam splitter splits light from an object, which is entered through a part of a photographing lens system, into a beam directed to a photographing CCD image sensor and a beam directed to a finder optical system.

The beam splitter used in such an electronic still camera has a beam splitting surface. A part of the light incident from the photographing lens is reflected by the beam splitting surface and directed to the finder optical system, and the remainder part of the light which passes through the beam splitting surface is directed to the CCD sensor.

In such a optical system, however, light entered from an eyepiece lens may disturb an object image formed on the image pickup surface of the CCD sensor. If light enters through the eyepiece lens of the finder optical system, the light may be incident onto the beam splitting surface and may pass through the beam splitting surface. The light passed through the beam splitting surface may be reflected on the end surface of the beam splitter, and is internally reflected thereby. Then, the reflected light is further reflected by an opposite side surface of the beam splitting surface, and may be incident on the CCD image sensor as a ghost light. It should be noted that the term "ghost light" refers to light which disturbs the image formed by the photographing optical system, i.e., the light which affects the image formed on the CCD image sensor, or image receiving surface. In addition to the above problem, due to recent tendency of increased magnification of the eyepiece lens of the finder system as the size of the CCD image sensor becomes smaller, intensity of the ghost light which may disturb the image formed on the CCD image sensor is increased.

SUMMARY OF THE INVENTION

It is therefore an object of the present invention to provide a beam splitting optical system capable of preventing light incident from the eyepiece lens of the finder system from reaching the image sensor as a ghost light.

According to an aspect of the invention, there is provided an optical system for a photographing device comprising: a photographing optical system for forming an image of a object; an image sensor for photographing the image formed y the photographing optical system; a finder optical system having an eyepiece through which an image of the object is observable; a beam splitting element disposed closer to the image than at least one of the lenses constituting the photographing optical system, the beam splitting element includes a beam splitting surface which allows a part of incident light to pass through, the other part of light being reflected by the beam splitting surface, the part of light passed through the beam splitting surface being incident on the image sensor and the other part of light reflected by the beam splitting surface being directed to the finder optical

2 system; and a ghost prevention surface onto which light entered through the eyepiece and passed through the beam splitting surface is incident, the ghost prevention surface being formed to prevent an incident light from being incident on the image sensor.

Thus, even if light enters from the eyepiece of the finder optical system, passes through the finder optical system and the beam splitting surface, the ghost light (i.e., the light which affects the object image) is not incident on the portion where the object image is formed.

In particular, the ghost prevention surface may be a surface which absorbs light incident on the ghost prevention surface, a surface which scatters light incident on the ghost prevention surface. Alternatively or additionally, the ghost prevention surface may be a surface which reflects light incident on the ghost prevention surface such that a reflected light is directed to a portion other than a portion at which the image is formed. If the ghost prevention surface is a flat surface, the surface could be substantially perpendicular to the optical axis of the photographing optical system after deflected by the beam splitting surface towards the finder optical system. In other words, the flat surface is parallel to the optical axis of the photographing optical system.

Optionally, the beam splitting element may be a prism type element including the beam splitting surface therein. In this case, a surface on which the light entered through the eyepiece and passed through the beam splitting surface is incident is formed to be the ghost prevention surface.

Alternatively, the light splitting element may be a plate-like half mirror. In this case, a wall surface on which the light entered through the eyepiece and passed through the beam splitting surface is incident is formed to be the ghost prevention surface.

Still optionally, the finder optical system guides the light split by the light splitting element directly to the eyepiece. That is, in a finder which does not employ a focusing plate, light may enter through the eyepiece towards the beam splitter. However, the ghost light can be sufficiently prevented.

According to another aspect of the invention, there is provided an optical system for a photographing device comprising: a photographing optical system for forming an image of an object; a finder optical system having an eyepiece through which an image of the object is observable; a prism type beam splitting element disposed closer to the image than at least one of the lenses constituting the photographing optical system, the beam splitting element includes a beam splitting surface which allows a part of incident light to pass through, the other part of light being reflected by the beam splitting surface, the other part of light reflected by the beam splitting surface being directed to the finder optical system; and a ghost prevention surface onto which light entered through the eyepiece and passed through the finder optical system and the beam splitting surface is incident, the ghost prevention surface being formed to prevent an incident light from being incident on a image receiving surface, wherein the ghost prevention surface is a surface of the prism type beam splitting element.

DETAILED DESCRIPTION OF THE PREFERRED EMBODIMENTS

Figure 1:
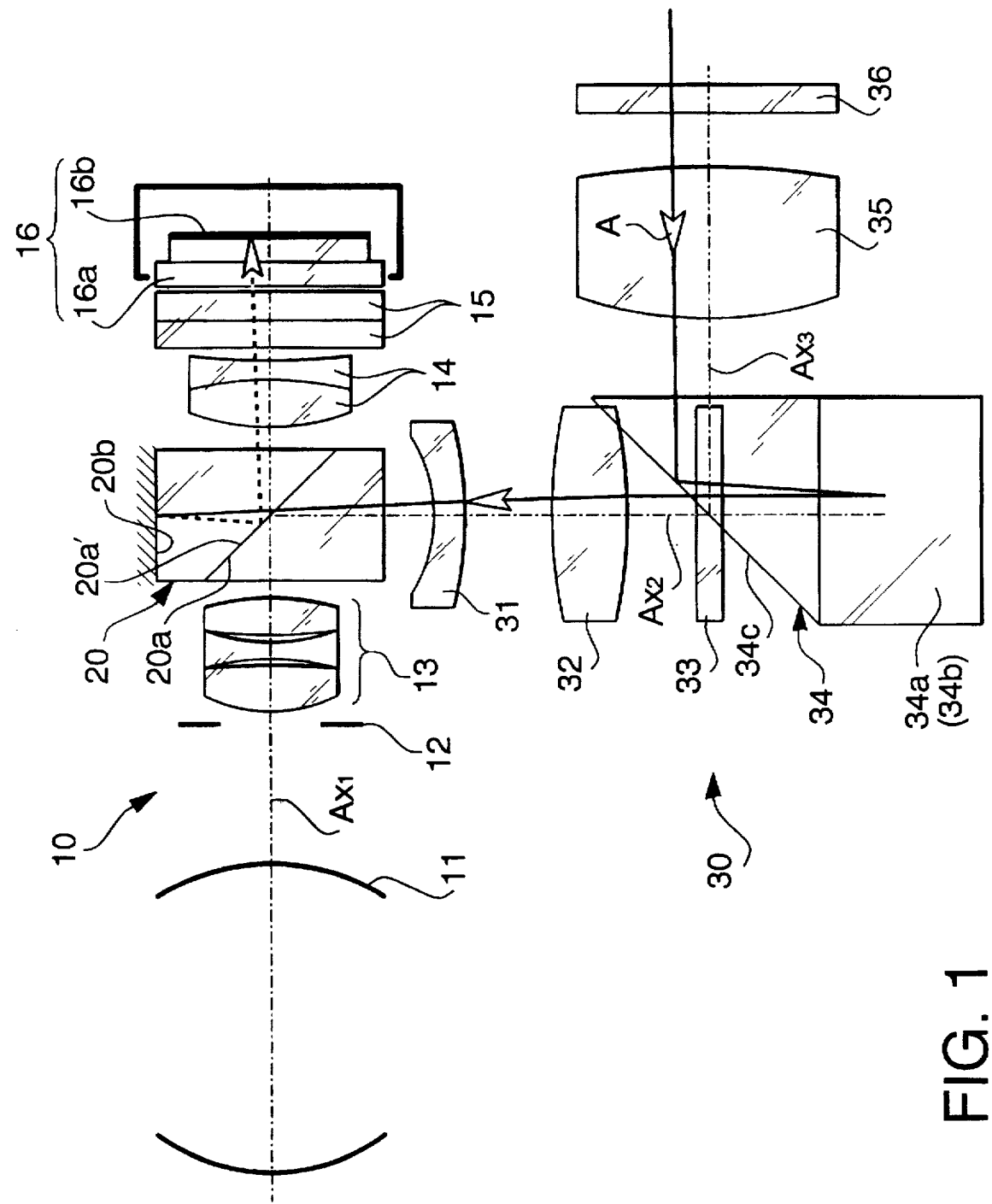
FIG. 1 is an explanatory view showing an optical system for a still video camera according to an embodiment of the invention.

FIG. 1 shows an optical system for a still video camera according to an embodiment of the present invention.

The optical system in FIG. 1 comprises a photographing optical system 10 for forming an image of an object; a beam splitter 20 disposed closer to the image than at least one of the lenses constituting the photographing optical system 10 to split a part of light that is incident from the object; and a finder optical system 30 for guiding the light split by the beam splitter 20 to the photographer's eye.

The photographing optical system 10 includes a first lens group 11, an aperture 12, a second lens group 13, a third lens group 14, a filter 15, and a CCD image sensor 16 that are disposed in this order along a first optical axis Ax1. On a front surface of the image sensor 16, a cover glass 16a is provided, and through the cover glass 16a, light passes towards an image pickup surface 16b.

The beam splitter 20, which has a rectangular parallelepiped shape, is disposed between the second lens groups 13 and the third lens groups 14 of the photographing optical system 10. The beam splitter 20 has a beam splitting surface 20a that crosses the optical axis Ax1 at 45 degrees therefrom. The beam splitting surface 20a is formed as a half mirror surface which allows a part of light incident thereon to pass therethrough, and reflects the remainder part of the light incident thereon. The light passed through the beam splitting surface 20a reaches the CCD image sensor 16 to form an object image on the image pickup surface 16b, while the light reflected by the beam splitting surface 20a is directed towards the finder optical system 30.

The finder optical system 30 includes a first lens 31, a second lens 32, an LCD (liquid crystal display) panel 33, an erecting prism 34, an eyepiece lens 35, and a cover glass 36, which are disposed in this order from the beam splitter 20. The elements from the first lens 31 to the LCD panel 33 are disposed along a second optical axis Ax2 which is perpendicular to the first optical axis Ax1. The eyepiece lens 35 and the cover glass 36 are disposed along a third optical axis Ax3 that is parallel with the first optical axis Ax1.

The erecting prism 34 includes three reflecting surfaces. Light emerged from the beam splitter 20 is reflected downward, i.e., in a direction perpendicular to the sheet of the drawing by a first reflecting surface 34a and reflected again in a direction towards the beam splitter 20 by a second reflecting surface 34b disposed perpendicularly to the first reflecting surface 34a. Then, the light is reflected by a third reflecting surface 34c to be directed to the eyepiece lens 35. The light then passes through the eyepiece lens 35 and the cover glass 36 to be observed by a photographer.

An end surface 20b of the beam splitter 20 toward which the light entered from the photographing optical system 10 is not directed is constituted as a ghost light prevention surface for preventing light, which would be entered the finder optical system 30 from the eye side and passes through the splitting surface 20a of the beam splitter 20, from being incident on the CCD image sensor 16.

In this embodiment, the surface 20b is formed to be an anti-reflection surface. Specifically, for preventing reflection, the surface 20b may be coated with a gloss-prevented black ink to absorb incident light, or the surface 20b may be formed as a ground surface with very small recessed and protruded portions to scatter light thereon.

When light is incident from the eye side of the finder optical system 30, i.e., through the cover glass 36, as shown by arrow A in FIG. 1, part of the light passes through the finder optical system 30 and is directed to the beam splitter 20. A part of the light emerged from the finder optical system 30 and incident on the beam splitter 20 passes through the beam splitting surface 20a and reaches the surface 20b. If the surface 20b were not the anti-reflection surface, the light emerged from the finer optical system 30 and incident on the surface 20b would be reflected there and further reflected by the opposite surface 20a' of the beam splitting surface 20a, and would be incident on the CCD image sensor 16 as the ghost light as indicated by broken lines in FIG. 1.

According to the present embodiment, since the surface 20b of the beam splitter 20 is formed to be the anti-reflection surface, even if the light emerged from the finder optical system 30 passes through the beam splitting surface 20a and reaches the surface 20b, the incident light is absorbed or scattered by the surface 20b, thereby preventing ghost light from being incident on the CCD image sensor 16, or at least reducing the intensity of light incident on the CCD image sensor 16 so that the ghost light does not affect image forming.

Modified embodiments of the present invention will be described hereinafter with reference to FIGS. 2 to 7.

In FIGS. 2 to 7, for simplifying drawings and description, the photographing optical system 10 is represented by only the first lens group 11, and the finder optical system 30 is represented by the erecting prism 34 and the eyepiece lens 35.

Figure 2:
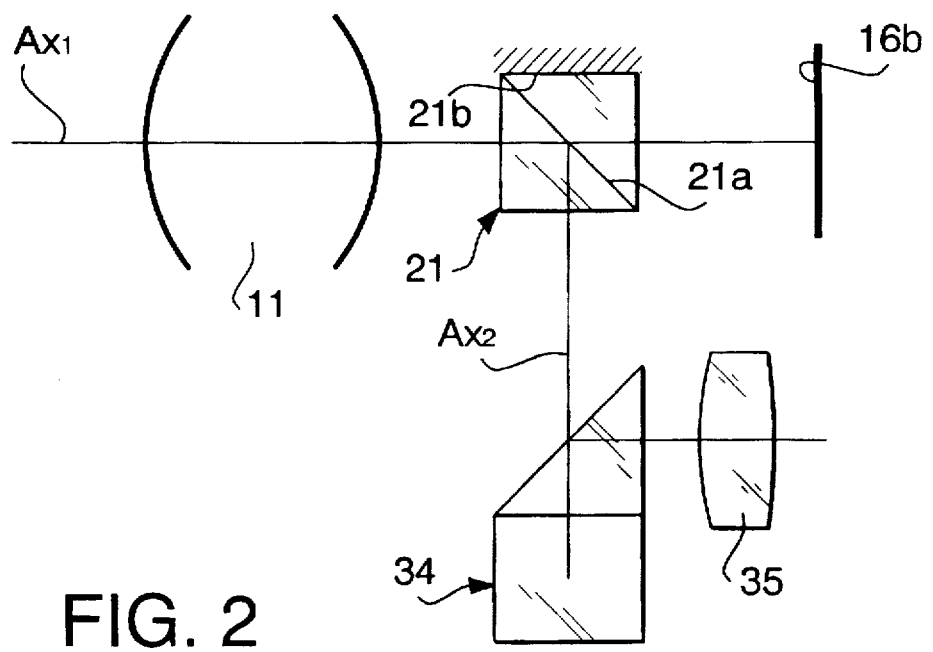
FIGS. 2 to 7 are an explanatory views showing first to sixth modifications.
Figure 3:
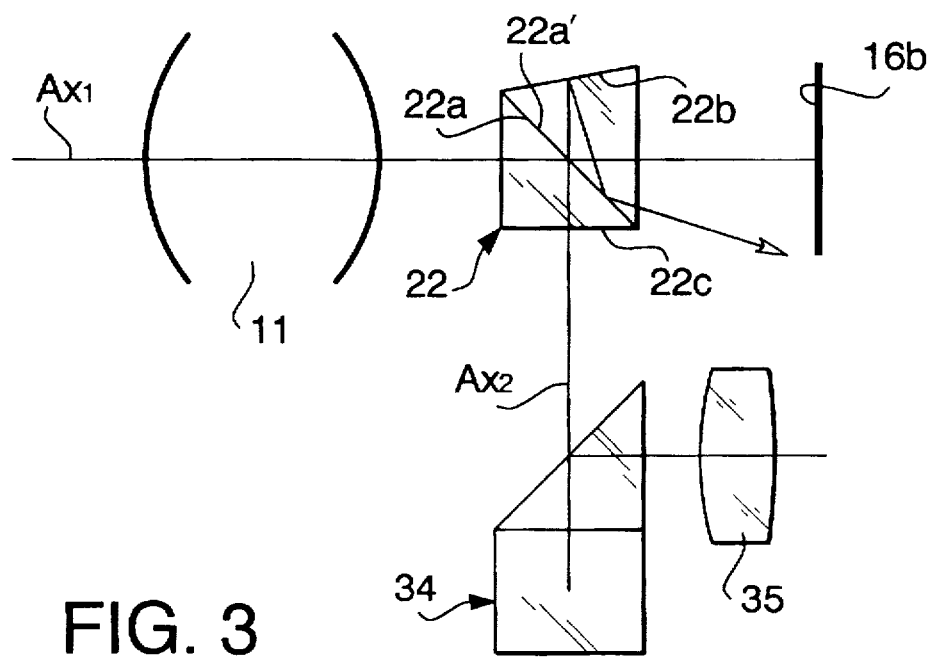
Figure 4:
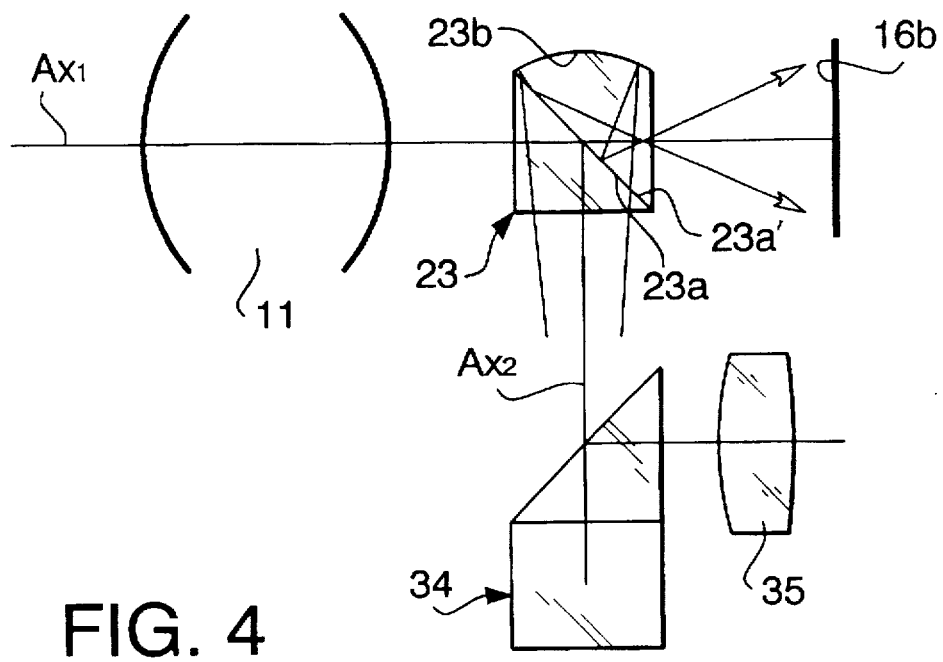
Figure 5:
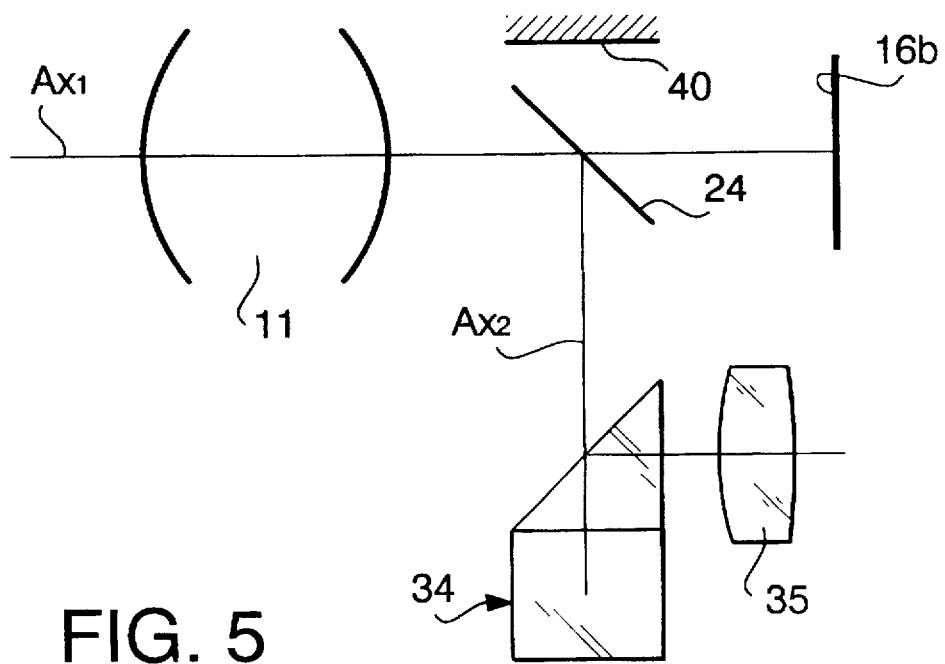
Figure 6:
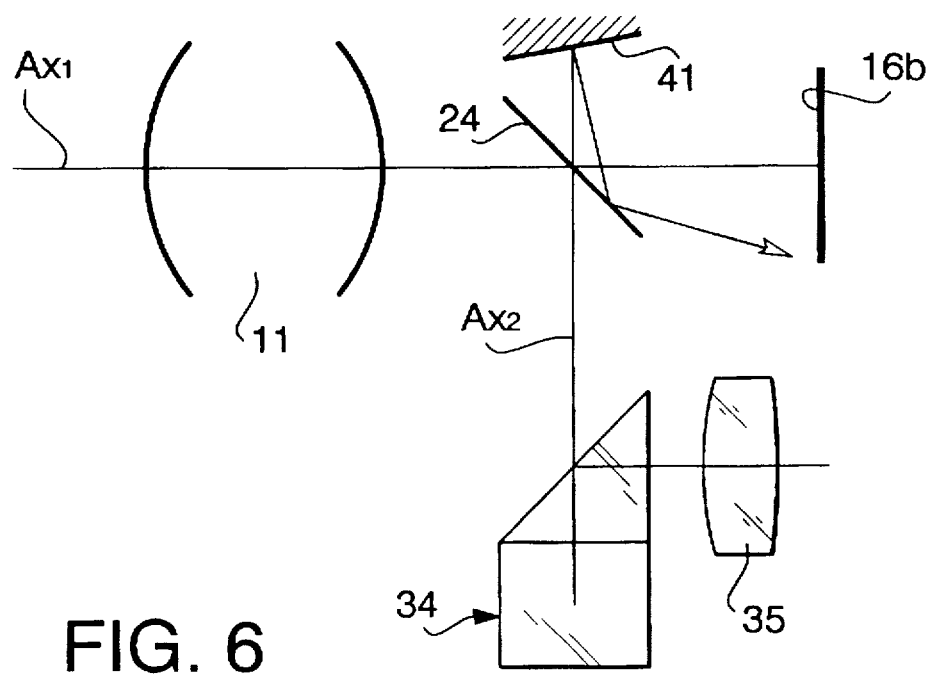
Figure 7:
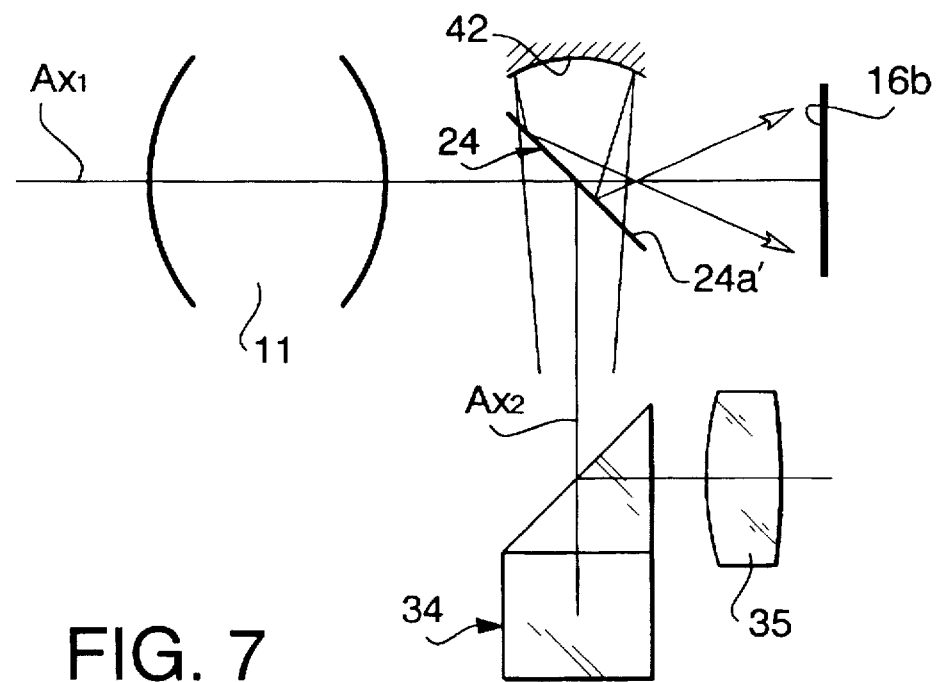

In the modification of FIGS. 2 to 4, the beam splitting element comprises a prism-type beam splitter 21, 22 or 23 as in FIG. 1, while in the embodiments of FIGS. 5 to 7, the beam splitting element comprises a plate-like half mirror 24.

FIG. 2 shows a photographing optical system wherein cubic beam splitter 21 formed by putting a pair of right-angle prisms together is employed. In this modification, similar to the embodiment described above, the surface 21b onto which the light entered from the eyepiece lens 35 and passed through erecting prism 34 (i.e., the finder optical system 30) and the beam splitting surface 21a may be incident is formed to be a ghost prevention surface to which the anti-reflection processing for absorbing or scattering incident light is applied.

A beam splitter 22 in FIG. 3 is constituted by modifying the shape of one of the right-angle prisms of the beam splitter 21 in FIG. 2 such that the surface 22b toward which a normal light (i.e., the light from the object) is not directed is formed not to be parallel with the opposite surface, the finder optical system 30 side surface 22c. In other words, the surface 22b is not perpendicular to the second optical axis Ax2. Since the surface 22b is tilted in this manner, even if light emerged from the finder optical system 30 passes through the beam splitting surface 22a and reaches the surface 22b, the light is then reflected such that the reflected light is not directed to the image pickup surface 16b (as shown by the arrow in FIG. 3) after reflected by an opposite surface 22a' of the beam splitting surface 22a. Thus, according to this modification, even if light enters through the finder optical system, the ghost light does not affect the object image formed on the image pickup surface 16b. It should be noted that, in FIG. 3, the surface 22b is tilted with respect to the first axis Ax1 (i.e., in other words, the surface 22b is not perpendicular to the second axis Ax2). However, as far as the reflected light is not directed to the image pickup surface 16b, the tilted direction of the surface 22b is not limited to the direction as shown in FIG. 3 but can be any direction.

A beam splitter 23 in FIG. 4 is constituted by modifying the shape of one of the right-angle prisms of the beam splitter 21 in FIG. 2 such that the surface 23b, toward which the normal light is not to be directed and onto which the light entered from the eyepiece lens 35 and passed through erecting prism 34 (i.e., the finder optical system 30) and a beam splitting surface 23a may be incident, is formed to be a concave surface. The curvature is determined such that light incident from the eyepiece lens 35 is once converged and then sufficiently diverged when the reflected light is incident on the image pick up surface 16b It should be noted that the surface 23b may be a cylindrical surface which has a curvature only in one direction shown in FIG. 4. It should also be noted that the surface 23b may be a convex surface. Since the surface 23b has a concave, or a curved surface as shown in FIG. 4, even if a light emerged from the finder optical system 30 passes through a beam splitting surface 23a and reaches the surface 23b, the light is reflected such that the light diverges after it is reflected by an opposite surface 23a' of the beam splitting surface 23a as shown by arrow in FIG. 4. Thus, the intensity of ghost light reaching the image pickup surface 16b of the CCD image sensor is reduced and the effects of ghost light affecting the object image formed on the image pickup surface 16b is avoidable.

In the modifications shows in FIGS. 5 to 7, a half mirror 24 is employed as a beam splitting element, and a wall surface 40, 41, or 42 of a camera casing wherein the photographing optical system is housed is constituted as ghost prevention surfaces. In case a plate-like half mirror is employed, the problem of ghost light will occur as in case of a prism-type element if a wall surface reflects light.

In the modification shown in FIG. 5, the wall surface 40 is formed to be an anti-reflection surface in order to prevent light emerged from the finder optical system 30 and passed through a half mirror 24 from being reflected on the surface 40, which is similar to the modification shown in FIG. 2.

In the modification shown in FIG. 6, a wall surface 41 is constituted to be tilted (i.e., the wall surface 41 is not perpendicular to the second optical axis Ax2), so that light emerged from the finder optical system 30 and passed through the half mirror 24 is reflected so as not to proceeds towards the image pickup surface 16b, which is similar to the modification shown in FIG. 3. It should be noted that, in FIG. 6, the wall surface 41 is tilted (i.e., is not parallel with the first axis Ax1). However, as far as the reflected light is not directed to the image pickup surface 16b, the tilted direction of the wall surface 41 is not limited to the direction as shown in FIG. 6 but can be any direction.

In the modification shown in FIG. 7, a wall surface 42 is constituted as a convex surface so that light emerged from the finder optical system 30 and passed through the half mirror 24 diverges, after reflected by the wall surface 42 and the opposite surface 24a' of the half mirror 24 to reduce the amount of ghost light reaching the image pickup surface 16b, as in the embodiment of FIG. 4. The curvature is determined such that light incident from the eyepiece lens 35 is once converged and then sufficiently diverged when the reflected light is incident on the image pick up surface 16b It should be noted that the wall surface 41 could be a concave surface. Alternatively, the wall surface 41 may be a cylindrical surface which has a curvature only in a plane parallel to a surface of FIG. 6.

In the modifications shown in FIGS. 3, 4, 6 and 7, the surfaces 22b, 23b and the wall surfaces 41 and 42 could be formed as anti-reflection surfaces, respectively, to more efficiently prevent ghost light from being incident on the image pickup surface 16b.

As described above, in accordance with the present invention, the end surface of the light splitting element or the wall surface of the casing onto which the light entered from the eyepiece lens 35 and passed through erecting prism 34 (i.e., the finder optical system 30) and the beam splitting surface (or the half mirror) is constituted as the ghost prevention surface. Thus, even if light is emerged from the eye side of the finder optical system, the ghost light can be prevented from reaching the image pickup surface or at least sufficiently reduced so that the object image formed by the photographing optical system is not disturbed.

The present disclosure relates to subject matter contained in Japanese Patent Application No. HEI 09-19887, filed on Jan. 18, 1997, which is expressly incorporated herein by reference in its entirety.

What is claimed is:

1. An optical system for a photographing device comprising:

a photographing optical system for forming an image of a object;

an image sensor for photographing the image formed by said photographing optical system;

a finder optical system having an eyepiece through which an image of said object is observable;

a beam splitting element disposed closer to said image than at least one of the lenses constituting said photographing optical system, said beam splitting element includes a beam splitting surface which allows a part of incident light to pass through, the other part of light being reflected by said beam splitting surface, said part of light passed through said beam splitting surface being incident on said image sensor and said other part of light reflected by said beam splitting surface being directed to said finder optical system; and a ghost prevention surface onto which light entered through said eyepiece and passed through said beam splitting surface is incident, said ghost prevention surface being formed to prevent an incident light from being incident on said image sensor.

2. The optical system according to claim 1, wherein said ghost prevention surface comprises a surface which absorbs light incident on said ghost prevention surface.

3. The optical system according to claim 2, wherein said ghost prevention surface comprises a flat surface which is substantially perpendicular to an optical axis of said photographing optical system after having been deflected by said beam splitting surface towards said finder optical system.

4. The optical system according to claim 1, wherein said ghost prevention surface comprises a surface which scatters light incident on said ghost prevention surface.

5. The optical system according to claim 1, wherein said ghost prevention surface comprises a surface which reflects light incident on said ghost prevention surface such that a reflected light is directed to a portion other than a portion at which said image is formed.

6. The optical system according to claims 1, wherein said beam splitting element comprises a prism type element, said prism type element including said splitting surface inside of said prism type element, and wherein a surface of said prism type element on which said light entered through said eyepiece and passed through said beam splitting surface is incident is formed to be said ghost prevention surface.

7. The optical system according to claim 1, wherein said light splitting element is a plate-like half mirror, and wherein a wall surface on which said light entered through said eyepiece and passed through said beam splitting surface is incident is formed to be said ghost prevention surface.

8. The optical system according to claim 1, wherein said finder optical system guides the light split by said light splitting element directly towards said eyepiece.

9. An optical system for a photographing device comprising:

a photographing optical system for forming an image of an object on an image receiving surface;

a finder optical system having an eyepiece through which an image of said object is observable;

a prism type beam splitting element disposed closer to said image than at least one of the lenses constituting said photographing optical system, said beam splitting element includes a beam splitting surface which allows a part of incident light to pass through, the other part of light being reflected by said beam splitting surface, said other part of light reflected by said beam splitting surface being directed to said finder optical system; and a ghost prevention surface onto which light entered through said eyepiece and passed through said finder optical system and said beam splitting surface is incident, said ghost prevention surface being formed to prevent an incident light from being incident on said image receiving surface, wherein said ghost prevention surface being a surface of said prism type beam splitting element.

10. The optical system according to claim 9, wherein said ghost prevention surface comprises a surface which absorbs incident light.

11. The optical system according to claim 9, wherein said ghost prevention surface comprises a surface which scatters incident light.

12. The optical system according to claim 9, wherein said ghost prevention surface comprises a surface which reflects incident light to a region other than the position at which said image is formed.

13. The optical system according to claim 9, wherein a surface on which said light entered through said eyepiece and passed through said beam splitting surface is incident is formed to be said ghost prevention surface.

14. The optical system according to claim 9, wherein said finder optical system guides the light split by said light splitting element directly to said eyepiece.

15. The optical system according to claim 10, wherein said ghost prevention surface comprises a flat surface which is substantially perpendicular to an optical axis extended from said finder optical system to said beam splitting element.

* * * * *